US005937365A

United States Patent [19]

Friton et al.

[11] Patent Number: 5,937,365

[45] Date of Patent: Aug. 10, 1999

[54] COMMUNICATIONS SYSTEM FOR VEHICLE WHEEL ALIGNMENT APPARATUS

[75] Inventors: Gerald E. Friton, Webster Groves; Thomas A. Meyer, St. Louis, both of Mo.

[73] Assignee: Hunter Engineering Company, Bridgeton, Mo.

[21] Appl. No.: 08/111,720

[22] Filed: Aug. 25, 1993

[51] Int. Cl.[6] .................... G01B 5/255

[52] U.S. Cl. .................... 702/106

[58] Field of Search .................... 455/45, 66; 340/539; 364/424.03, 559, 424.05; 702/106

[56] References Cited

U.S. PATENT DOCUMENTS

| | | | |
|---|---|---|---|
| Re. 33,144 | 1/1990 | Hunter et al. | 356/155 |
| 3,896,435 | 7/1975 | Constant | 342/109 |
| 4,147,980 | 4/1979 | Rook | 325/24 |
| 4,274,738 | 6/1981 | Hollandsworth et al. | 356/155 |
| 4,274,739 | 6/1981 | Grubbs et al. | 356/155 |
| 4,275,398 | 6/1981 | Parker et al. | 342/201 |
| 4,320,531 | 3/1982 | Dimon | 455/203 |
| 4,381,548 | 4/1983 | Grossman et al. | 364/559 |
| 4,761,749 | 8/1988 | Titsworth et al. | 364/559 |
| 4,879,670 | 11/1989 | Colarelli | 364/424.03 |
| 5,044,746 | 9/1991 | Henseli | 356/155 |
| 5,048,954 | 9/1991 | Madey et al. | 356/155 |
| 5,093,786 | 3/1992 | Derks | 364/240.9 |
| 5,208,646 | 5/1993 | Rogers et al. | 356/152 |

OTHER PUBLICATIONS

Gray et al., Radio Transmitters, McGraw–Hill Book Co., Inc., pp. 158–173, Dec. 1961.

Glasgow, Principles of Radio Engineering, McGraw–Hill Book Co., Inc., pp. 381–384, Dec. 1936.

*Primary Examiner*—John Barlow
*Assistant Examiner*—Craig S. Miller
*Attorney, Agent, or Firm*—Polster, Lieder, Woodruff & Lucchesi, LC

[57] ABSTRACT

Communication system for vehicle wheel alignment apparatus includes transceivers for each wheel sensor and a plurality of transceivers disposed at a control console or control remote unit. Communication is accomplished with any particular sensor transceiver by switching among the control transceivers as follows: (1) If the sensor transceiver does not respond, switch the transmitter portions of the control transceivers sequentially until the sensor transceiver does respond, and (2) if the signal from the sensor transceiver is garbled, switch the receiver portions of the control transceivers sequentially until the message is ungarbled. The transmitter and receiver portions of the control transceivers are controlled independently, so that for a particular message transmission may use a first control transceiver and reception may use a second control transceiver. The communication between sensor transceivers and the control transceivers is cross-band, with all sensor transceivers using the same transmission frequency and a second, different reception frequency. Each transceiver uses the receiver mixer stage as the final, power amplification stage for the transmitter. Transmission is via an AM modulated FM subcarrier.

21 Claims, 5 Drawing Sheets

COMMUNICATIONS SYSTEM FOR VEHICLE WHEEL ALIGNMENT APPARATUS

BACKGROUND OF THE INVENTION

This invention relates to apparatus for aligning vehicle wheels, and more particularly to radio frequency communication systems for such apparatus.

Apparatus for aligning vehicle wheels typically use sensors mounted at each wheel and a central console (or a handheld remote unit) which receives and manipulates data from the sensors. Communication between the sensors and the console (or remote unit) is conventionally accomplished over electrical cables. Cables, however, do have certain drawbacks. They tend to get in the way, they must be physically installed by the user, and their length is fixed (requiring consistent placement of the vehicle). On the other hand, cables provide a reliable communications channel and are relatively inexpensive.

At least one cordless communications system has been proposed. This system, described in U.S. Pat. No. 4,761,749 to Titsworth et al., uses infrared light beams for communications (although the reference states without explanation that radio frequencies could also be used). Infrared systems have proved to be difficult to implement in practice. They suffer from interference from sunlight and they typically require line-of-sight orientations to function properly. Moreover, the baud rate (transfer rate) of economical IR systems is slower than desirable.

Radio frequency (RF) systems also suffer from potential drawbacks. Such systems can be much more expensive than cable-based systems. Radio waves, particularly at the higher frequencies, undergo multiple reflections, and their transmission paths can even be affected by a technician/user walking about the service area. Moreover, there are numerous possible sources of signal error, particularly if the desired turnaround time between sensor and console (or remote unit) is rather short. Particularly at higher frequencies, shielding between units is difficult, expensive, or both. Data misinterpretation is also a significant drawback with RF systems. For example, signals from one sensor unit may be misinterpreted by another sensor unit as a signal from the console (or remote unit). Similarly, noise may be misinterpreted as signal.

SUMMARY OF THE INVENTION

Among the various objects and features of the present invention may be noted the provision of an improved communication system for vehicle wheel alignment apparatus.

Another object is the provision of such a system which does not impede free movement of a technician/user in the service bay.

A third object is the provision of such a system which is readily installed on any vehicle.

A fourth object is the provision of such a system which is relatively forgiving of vehicle placement in the service bay.

A fifth object is the provision of such a system which is insensitive to visual light and infrared interference.

A sixth object is the provision of such a system which does not require line-of-sight orientation of console (or remote unit) and sensors.

A seventh object is the provision of such a system which is relatively inexpensive.

An eighth object is the provision of such a system which is reliable.

A ninth object is the provision of such a system which reduces signal error.

A tenth object is the provision of such a system which operates well at high frequencies.

An eleventh object is the provision of such a system which varies the communication channels during use to improve signal transmission and reception.

A twelfth object is the provision of such a system with an improved baud rate.

Other objects and features will be in part apparent and in part pointed out hereinafter.

Briefly, in a first aspect, a vehicle wheel alignment apparatus of the present invention includes a wheel alignment sensor adapted to be mounted to a vehicle wheel for providing alignment data, and a controller responsive to data from the wheel alignment sensor for determining wheel alignment characteristics of the wheel under test. A first radio frequency sensor receiver is disposed at the sensor for receiving radio frequency signals, as is a first radio frequency sensor transmitter for transmitting radio frequency signals carrying alignment data from the sensor. At least first and second radio frequency controller receiver circuits are disposed at the controller and operatively connected thereto for receiving signals from the sensor transmitter. Similarly, at least first and second radio frequency controller transmitter circuits are disposed at the controller and operatively connected thereto for transmitting signals to the sensor receiver. The sensor receiver is tuned to receive signals transmitted by the controller transmitter circuits for communication between the controller and the sensor receiver, and the controller receiver circuits are tuned to receive signals transmitted by the sensor transmitter for communication of wheel alignment data from the sensor transmitter to the controller.

In a second aspect, vehicle wheel alignment apparatus of the present invention includes a wheel alignment sensor adapted to be mounted to a vehicle wheel for providing alignment data, and a controller responsive to data from the wheel alignment sensor for determining wheel alignment characteristics of the wheel under test. A first sensor transceiver is disposed at the sensor for transmitting and receiving radio frequency signals. At least a first controller transceiver is disposed at the controller and operatively connected thereto for transmitting signals to and receiving signals from the sensor transceiver. The sensor transceiver and controller transceiver are tuned to communicate with each other. At least one of the transceivers has a mixer stage connected to a local oscillator and to an antenna for receiving transmitted signals and converting the transmitted signals to an intermediate frequency signal. The mixer stage is configured to function as the final, power amplification stage of the transmitter portion of the transceiver for transmitting signals to the other transceiver.

In a third aspect of the present invention, vehicle wheel alignment apparatus includes a wheel alignment sensor adapted to be mounted to a vehicle wheel for providing alignment data, and a controller responsive to data from the wheel alignment sensor for determining wheel alignment characteristics of the wheel under test. A first sensor transmitter/receiver pair is disposed at the sensor for transmitting and receiving radio frequency signals. At least a first controller transmitter/receiver pair is disposed at the controller and operatively connected thereto for transmitting signals to and receiving signals from the sensor. The sensor transmitter/receiver pair transmits at a first frequency and receives at a second, substantially different frequency, while the controller transmitter/receiver pair transmits at the second frequency and receives at the first frequency.

In a fourth aspect, vehicle wheel alignment apparatus of the present invention includes a wheel alignment sensor adapted to be mounted to a vehicle wheel for providing alignment data, and a controller responsive to data from the wheel alignment sensor for determining wheel alignment characteristics of the wheel under test. A first sensor transceiver is disposed at the sensor for transmitting and receiving radio frequency signals, and at least a first controller transceiver is disposed at the controller and operatively connected thereto for transmitting signals to and receiving signals from the sensor transceiver. The sensor transceiver and controller transceiver are tuned to communicate with each other. At least one of the transceivers has a local oscillator and a mixer stage, the mixer stage being connected to the local oscillator and to an antenna for receiving transmitted signals and converting said transmitted signals to an intermediate frequency signal. That transceiver further includes an FM subcarrier generator connected to the local oscillator to modulate the local oscillator output to offset the transmission frequency of the transceiver from the reception frequency of the transceiver by an amount which differs substantially from the intermediate frequency.

In a fifth aspect of the present invention, a method of communicating between at least one vehicle wheel alignment sensor and a controller of vehicle wheel alignment apparatus includes providing a sensor transceiver operatively connected to a wheel alignment sensor, and providing a controller transceiver operatively connected to a controller, the controller being responsive to data from the wheel alignment sensor for determining wheel alignment characteristics of the wheel under test. In at least one of the transceivers, a local oscillator is used to provide a signal at a predetermined frequency, and a signal received from the other transceiver is mixed with the local oscillator signal in a mixer stage for converting the received signal to an intermediate frequency signal. The local oscillator output signal during transmission is used to generate a transmission signal and the mixer stage is used for final amplification of the transmission signal.

In a sixth aspect, a method of communicating between at least one vehicle wheel alignment sensor and a controller of vehicle wheel alignment apparatus of the present invention includes providing a sensor transceiver operatively connected to a wheel alignment sensor, and providing a controller transceiver operatively connected to a controller, the controller being responsive to data from the wheel alignment sensor for determining wheel alignment characteristics of the wheel under test. The sensor transceiver transmits at a first frequency and receives at a second, substantially different frequency, and the controller transceiver transmits at the second frequency and receives at the first frequency.

In a seventh aspect of the present invention, a method of communicating between at least one vehicle wheel alignment sensor and a controller of vehicle wheel alignment apparatus includes providing a sensor transceiver operatively connected to a wheel alignment sensor, and providing a first controller transceiver circuit operatively connected to a controller, the controller being responsive to data from the wheel alignment sensor for determining wheel alignment characteristics of the wheel under test. At least a second controller transceiver circuit is operatively connected to the controller. The method further includes the steps of switching between controller transceiver circuits for signal transmission when the sensor transceiver does not respond, and switching between controller transceiver circuits for signal reception when the received signal is garbled.

In an eighth aspect, a method of communicating between at least one vehicle wheel alignment sensor and a controller of vehicle wheel alignment apparatus of the present invention includes providing a sensor transceiver operatively connected to a wheel alignment sensor, and providing a controller transceiver operatively connected to a controller, the controller being responsive to data from the wheel alignment sensor for determining wheel alignment characteristics of the wheel under test. In at least one of the transceivers, a local oscillator provides a signal at a predetermined frequency. A signal received from the other transceiver is mixed with the local oscillator signal for converting the received signal to an intermediate frequency signal. The local oscillator output signal is modulated during transmission to generate a transmission signal, the step of modulating the local oscillator output signal including modulating the local oscillator output signal with an FM subcarrier, and further AM modulating the FM subcarrier.

BRIEF DESCRIPTION OF THE DRAWINGS

Similar reference characters indicate similar parts throughout the several views of the drawings.

DESCRIPTION OF THE PREFERRED EMBODIMENT

Figure 1:
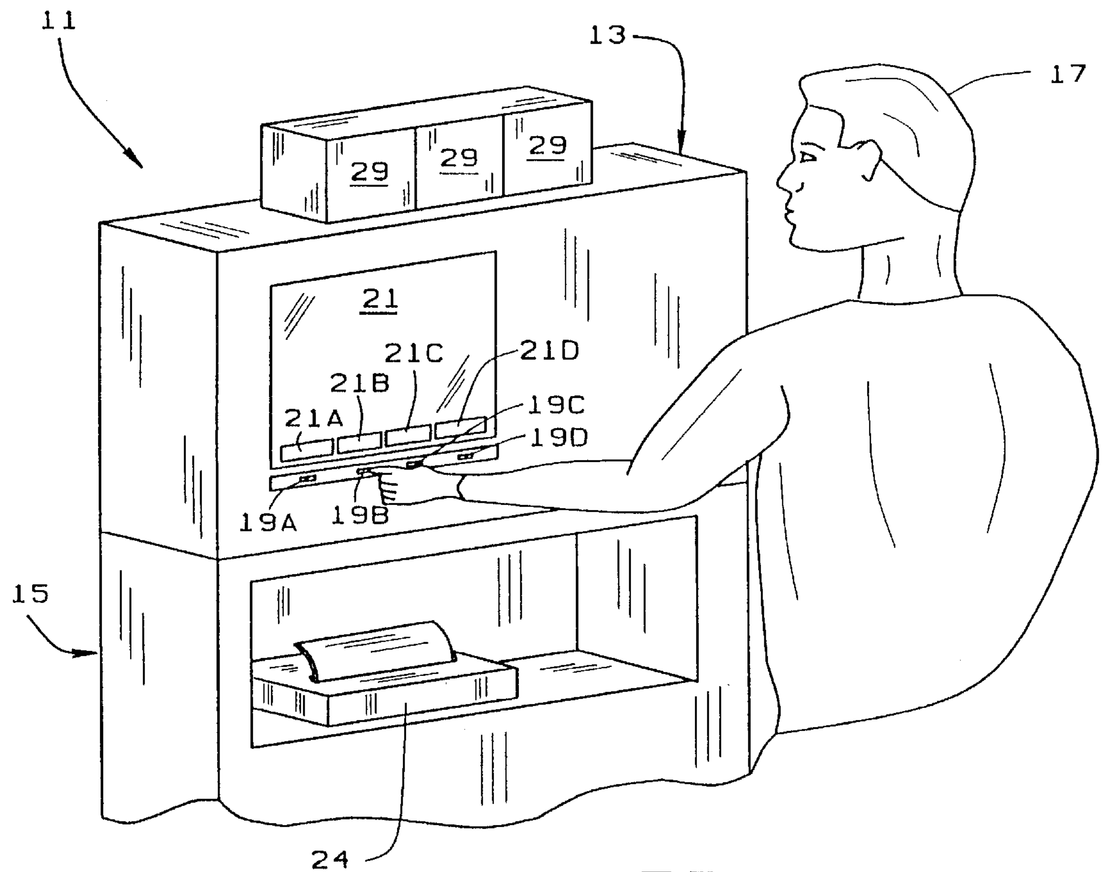
FIG. 1 is a perspective view of a vehicle alignment system console (with a technician/user) of the present invention.
Figure 2:
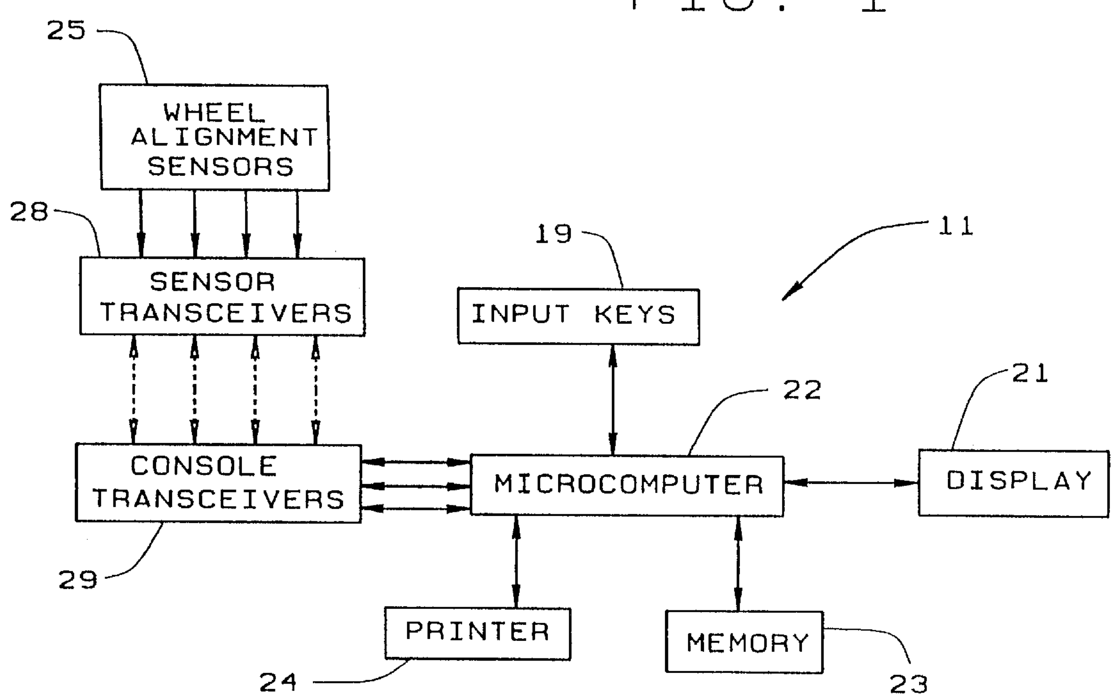
FIG. 2 is a block diagram of the circuitry of the system of FIG. 1.

Turning to the drawings, and more particularly to FIGS. 1 and 2, there is shown a vehicle wheel alignment system 11 of the present invention. Alignment system 11 includes a console 13 suitably mounted on a stand 15 for use by a technician/user 17. Console 13 includes a set of manually operable input keys or switches 19(A–D) and a display 21. Optionally, a remote unit (not shown) may be used in place of console 13. The remote unit is suitably sized to be carried and used by the technician as the vehicle is aligned.

Input keys 19 and display 21 are connected to a microcomputer 22 which functions as an electronic controller to control the operation of system 11. The bottom of display 21 contains four variable function blocks 21A–D (the display of which is controlled by microcomputer 22). Function blocks 21A–D are disposed directly over corresponding switches 19A–D and display to the user the function of those switches at that particular time in the program which controls the operation of microcomputer 22.

Any number of different microcomputers may be used in system 11, depending upon the other requirements of the system. Microcomputer 22 is shown in FIG. 2 connected to a digital memory 23, and a printer 24. It should be understood that memory 23 could be internal to microcomputer 22, depending upon the particular microcomputer used. In addition, other peripheral devices (not shown) could be connected to microcomputer 22 as desired.

A plurality of wheel alignment sensors 25 are operatively connected to microcomputer 22 for supplying alignment information to the microcomputer. The use of such sensors to measure alignment characteristics is, of course, well known. See, U.S. Pat. No. Re 33,144 to Hunter et al., U.S. Pat. Nos. 4,381,548 to Grossman et al., and 4,879,670 to Colarelli, the disclosures of which are incorporated herein by reference.

Figure 3:
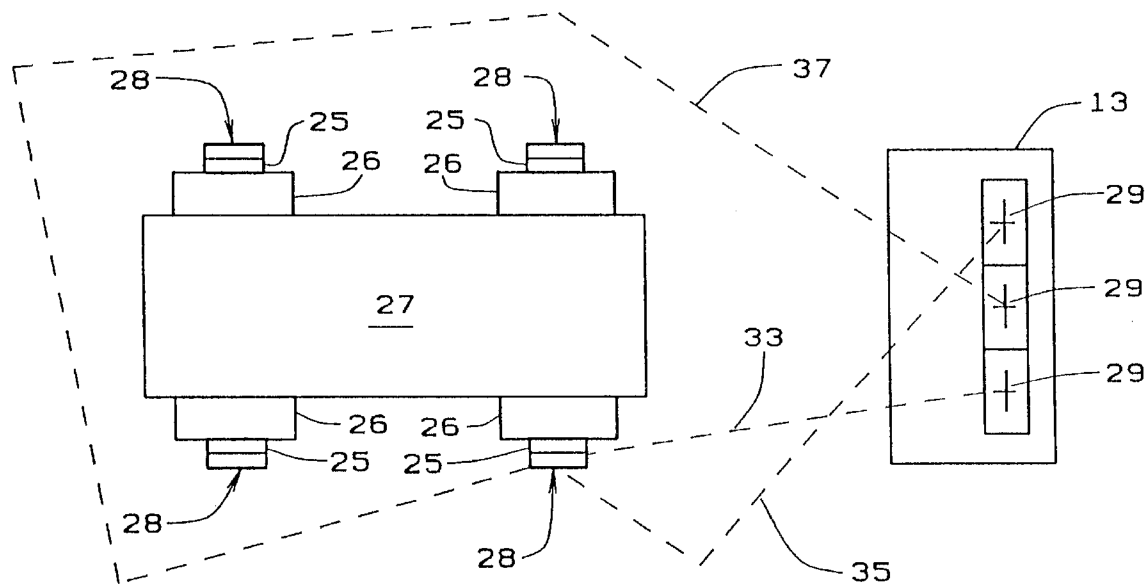
FIG. 3 is a block diagram illustrating the overall system of the present invention.
Figure 3A:
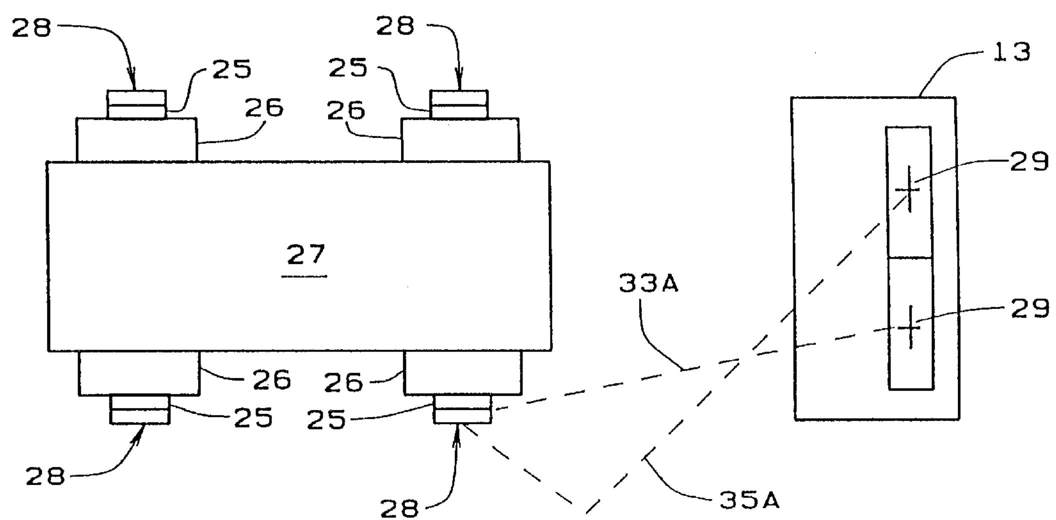
FIG. 3A is a block diagram similar to FIG. 3 illustrating another embodiment of the overall system of the present invention.

More particularly, each wheel 26 (see FIGS. 3 and 3A) of a vehicle 27 has suitably mounted thereon a wheel alignment sensor 25 for sensing wheel alignment data. Each wheel alignment sensor has associated therewith a sensor transceiver 28, described in detail below. The four sensor transceivers 28 communicate using RF signals with a set of two or three control transceivers 29 disposed at console 13 (or at the remote unit). The three control transceiver configuration is shown in FIG. 3 while the two control transceiver configuration is shown in FIG. 3A. In both configurations, the control transceivers are operatively connected to microcomputer 22, which functions as the system controller.

As can be best seen in FIG. 3, the communication system of the present invention does not rely on line-of-sight orientation of the transceivers. Although the communication between transceiver 28 of the right-front sensor may communicate with the lowermost control transceiver 29 in line-of-sight fashion as indicated by line 33, this will not necessarily be the case. Due to reflections, interference, and/or standing waves, for example, the communications path indicated by line 33 may not be the best one or even an acceptable path. The reflected path indicated by the line 35 between the sensor transceiver and the topmost control transceiver 29 may be the only acceptable path (or at least be superior in some sense). Or the multiply-reflected path indicated by the line 37 between the sensor transceiver and the middle control transceiver 29 may be superior (or the only acceptable path). Moreover, it may be that path 35 is superior for transmission from the controller (disposed at the console or at the remote unit) to the sensor, while path 37 is superior for transmission in the reverse direction (from the sensor to the controller). Because of this, microcomputer 22 controls the transmitter and receiver portions of control transceivers 29 independently to obtain acceptable communications in both direction. Specifically, the criteria for switching from one control transmitter to a different control transmitter is that the sensor being addressed does not respond. In the event that there is no response after repeated attempts by the control transmitters to the sensor, then the control receiver is switched as well and the control transmitters are sequentially tried again in an attempt to communicate with the sensor.

For example, using the first control receiver, the unit attempts to raise the desired sensor using the first control transmitter, then the second control transmitter, and then the third control transmitter. This process is repeated (still using the first control receiver) for a predetermined number of times. If there is still no response from the sensor, the unit switches to the second control receiver and repeats the same steps. Likewise, if there is no response and there is a third control transceiver, the process may be repeated using the third control receiver.

In addition to switching receivers as described above, the unit switches control receivers when the sensor being addressed does respond, but the data is garbled. Errors in the data are detected by conventional methods such as checksum or CRC error detection. The microcomputer switches sequentially and independently among the transmitter and receiver portions of control transceivers 29 until all criteria are satisfied.

Communication between sensor transceivers 28 and control transceivers 29 is via serial binary data at a rate of 125 Kbaud, half duplex. The signals are non-return-to-zero (NRZ) with a high-going-low start bit and eight data bits per byte. The RF transmission, explained in detail below, is cross-band using an FM subcarrier which is AM modulated by the data. The communication itself only occupies approximately 15% of the available time, so communication is intermittent and burst in nature.

There are preferably three communications protocols:

(1) A normal read in which one of the control transceivers 29 "wakes" a sensor transceiver with an address/command byte, these being different for the four different sensor transceivers. The corresponding sensor transceiver then sends a byte of data in response to the control transceiver sending a "request for data" command to the sensor. This protocol has a transmit to receive turnaround of less than forty microseconds and is used for arbitrary length arrays of data.

(2) One of the control transceivers wakes the desired sensor transceiver with an address/command byte. The sensor transceiver then sends a packet of an arbitrary number of bytes of data to the control transceiver.

(3) One of the control transceivers wakes the target sensor transceiver with an address/command byte. The sensor transceiver acknowledges by sending the byte back to the control transceiver. The control transceiver then sends one byte of data to the target sensor transceiver, which acknowledges it by sending the byte back. This byte-for-byte handshaking continues until all the data is sent.

Note from FIG. 3 that there are seven RF transceivers (three control transceivers 29 and four sensor transceivers 28). Optionally (as shown in FIG. 3A) the system may have only six RF transceivers, it having been found that a system with two control transceivers 29 rather than three works satisfactorily. Due to the short turnaround time required by the communication protocols, it is preferred that the sensor transceivers transmit on a first frequency and receive at a second, substantially different frequency. For example, a sensor transmit frequency of 919.7 MHz and a sensor receive frequency of 910.0 MHz has been used successfully. The intermediate frequency for the receivers is, as explained below, 10.7 MHz. Similarly, the control transceivers transmit on the second frequency (910.0 MHz) and receive at the first frequency (919.7 MHz). Furthermore, a gated subcarrier scheme is used, described in detail below, to attain an on-off ratio greater than 60 dB of the sideband falling within the other transceiver's receive passband. Using a gated subcarrier at 1.0 MHz, one of the sidebands created falls into the passband of the opposite-end receiver.

It should be noted that the frequencies used fall into the 902–928 MHz band. (Of course, any suitable UHF band would be useable as well.) The 902–928 MHz band has sufficient width so that several "channels" are useable in the same area without appreciable interference. For example, the present invention could be used in a facility with three service bays. The alignment apparatus in each service bay would operate at slightly different frequencies in the 902–928 MHz band, so that they would not interfere with each other. Each receiver has a passband of about 400 KHz. In the multiple-service bay configuration, the second set of transceivers would normally be 2.5 MHz removed from the first set in the same area. The third would be at 5.0 MHz removed from the first. The "X.5" MHz channels interleave with the "X.0" MHz channels, and can be spaced fairly closely.

It should also be noted that although the invention is described herein in terms of switching (pursuant to the above criteria) between discrete transceivers as required for satisfactory communications, in fact the switching may occur at other levels. For example, instead of switching between transceivers, a single control transceiver may be suitably connected to a pair of antennas and the switching occur from one antenna to the other. Likewise, the switching may occur at the RF stage level as a further alternative. In each of these embodiments, the communications path is switched to a different circuit as needed. For example, in the embodiment described hereinafter each control transceiver constitutes a separate circuit. In the embodiment with two antennas, one circuit is made up of a single transceiver unit and a first antenna, while a second circuit is made up of the same transceiver unit and the second antenna.

It should also be noted that the feature of sensors ignoring other sensors, while accomplished in the apparatus described herein by using a cross-band scheme, can be accomplished in other ways. For example, the same effect can be accomplished using a single frequency with an additional bit communication protocol. In this system, the sensor to console communication could contain the additional bit, while the console to sensor communication would not (or vice versa). Software or hardware within the sensors would prevent sensor to console transmissions from one sensor from being misinterpreted as console to sensor transmissions by the other sensors.

Each transceiver is substantially the same, except for the difference in frequencies mentioned above for sensor transceivers and control transceivers. This difference is readily attained simply by changing the frequency of a local oscillator (L.O.) from 910.0 MHz for the control transceivers to 919.7 MHz for the sensor transceivers. Other than this difference, all transceivers are substantially the same and are illustrated in FIGS. 4A–4C.

Figure 4A:
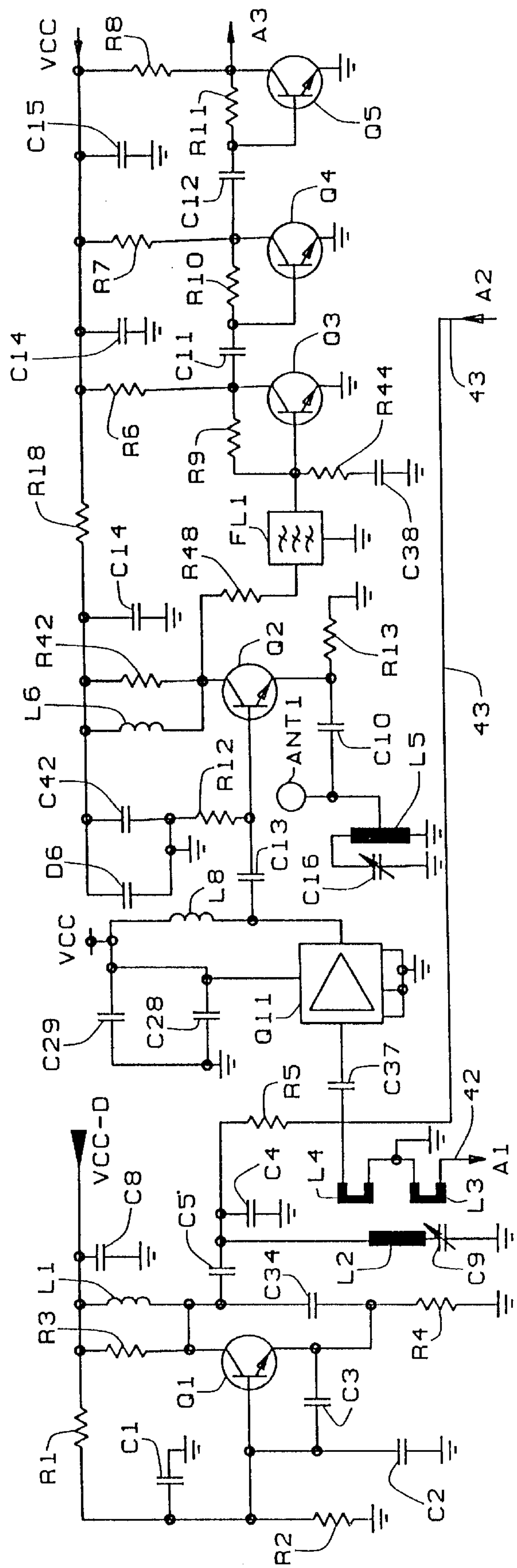
FIGS. 4A–4C are electrical schematics of the circuitry of the transceivers used in the present invention.
Figure 4B:
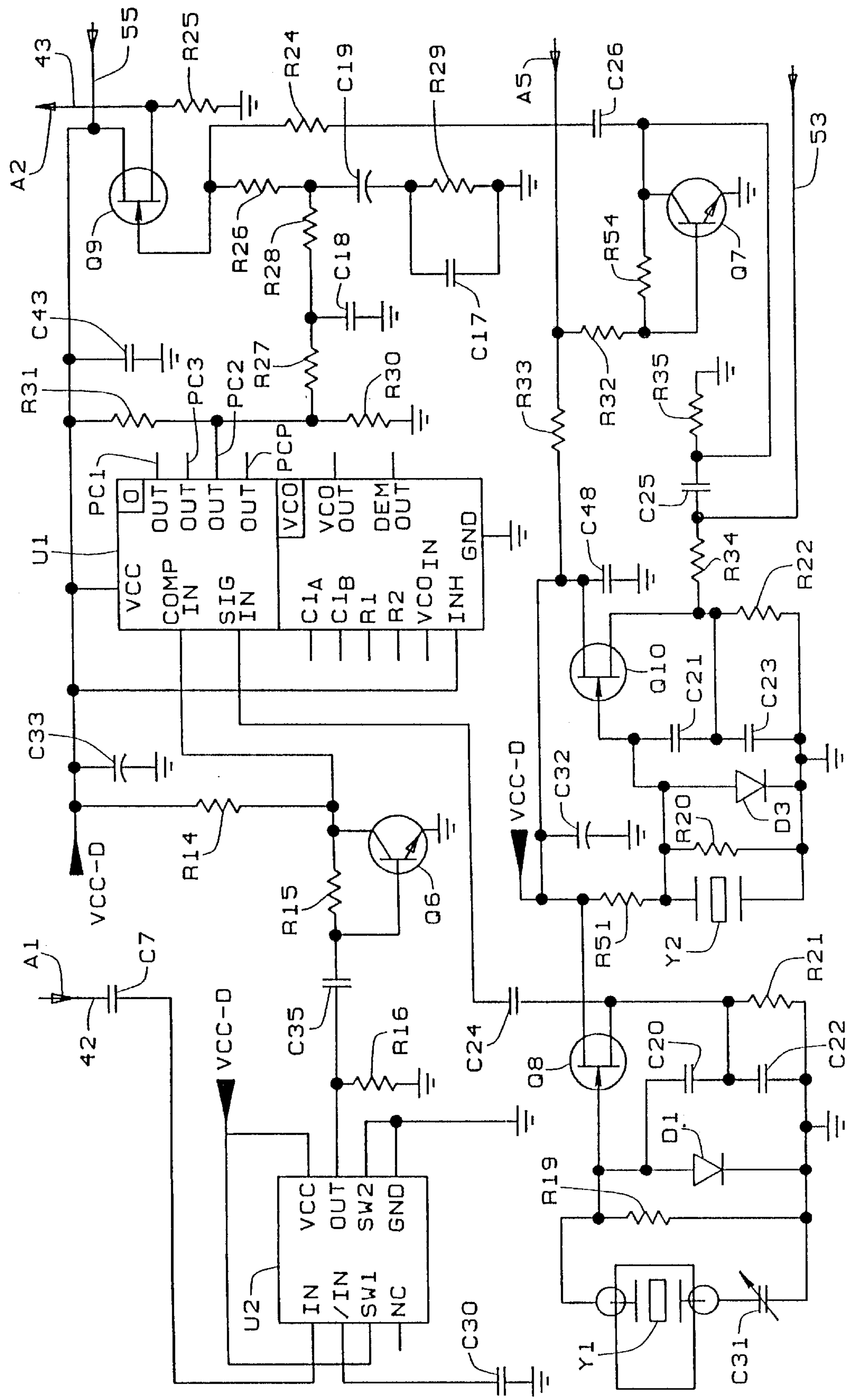
Figure 4C:
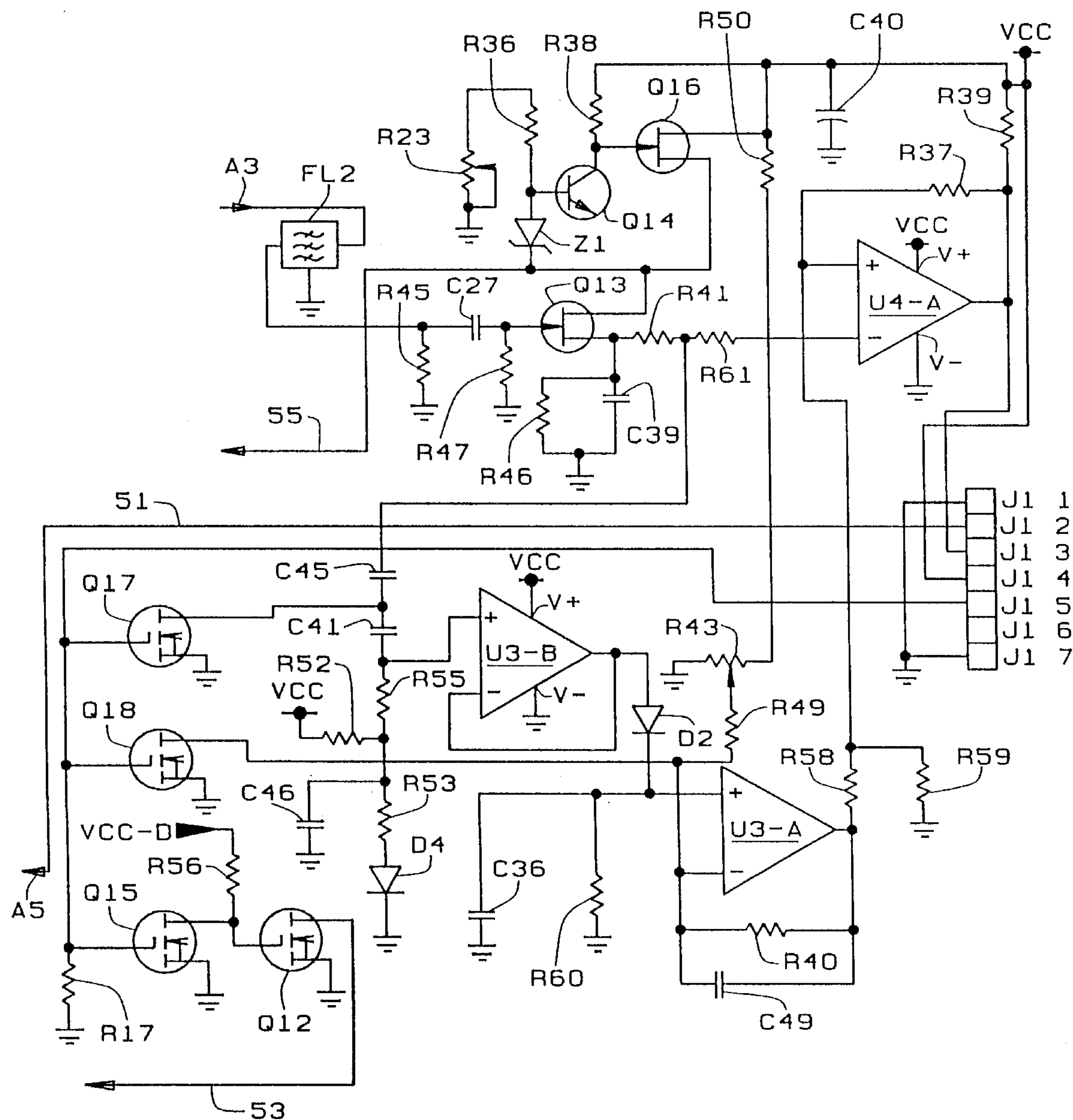

The local oscillator, labelled 41 and shown in the upper lefthand corner of FIG. 4A, includes a transistor Q1 with a tank circuit made up of an inductor L2 and a capacitor C9. Transistor Q1 in combination with the tank circuit forms a voltage tuneable oscillator, with a tuning range of about 100 MHz for a 0.5 to 5 volt control input injected by a resistor R5 at the top of inductor L2.

Local oscillator 41 is phase locked loop (PLL) controlled as follows: A pick-up loop L3 supplies the local oscillator output (from inductor L2) through a lead 42 and a capacitor C7 (FIG. 4B) to a divider U2, where the oscillator frequency is divided by 128. The resultant, at a frequency of approximately 7 MHz, is supplied through a capacitor C35 to an amplifier Q6. The amplified waveform is then applied to the COMP input of a phase detector U1. In phase detector U1, the phase of the local oscillator is compared to a reference frequency from a Colpitts oscillator which includes a crystal Y1 (shown at the lower lefthand corner of FIG. 4B), a variable capacitor C31, and a transistor Q8. Capacitor C31 is used in precisely setting crystal Y1's frequency, and also provides temperature compensation, cutting the drift to ⅓ that with no compensation. Crystal Y1 has a nominal frequency range of 7.06 to 7.22 MHz, the actual frequency differing for sensor transceivers, on the one hand, and control transceivers, on the other.

The output of the Colpitts oscillator is supplied through a capacitor C24 to the SIG input of phase detector U1. This output is compared with the divided output of the local oscillator in chip U1 and the output (on pin $PC2_{OUT}$) is supplied through a lead-lag type low pass filter (LPF) (made up of resistors R27, R28, R29 and capacitors C17, C18, and C19) to transistor Q9 (shown at the upper righthand corner of FIG. 4B). Transistor Q9 buffers the output of chip U1 through the LPF and supplies the control voltage (via a lead 43 and resistor R5) back to the L2-C9 tank circuit, which completes the phase locked loop.

As is well known, phase locked loops are sensitive to noise. As a result, a very low dropout regulator is provided, composed of transistors Q14 and Q16 (FIG. 4C). The regulated power (at 4.6 volts) is supplied via a lead 55 from transistor Q16 to the PLL circuitry (FIG. 4B). This materially cleans the power, with the result that the local oscillator is much cleaner, which means cleaner transmit and receive channels.

The output of the local oscillator 41 (FIG. 4A) is also supplied by a second pick-up loop L4 through a capacitor C37 to a monolithic microwave integrated circuit (MMIC) Q11 which amplifies the local oscillator output and supplies it through a capacitor C13 to the base of a power amplifying transistor Q2 (located at about the midpoint of FIG. 4A). Transistor Q2 has two functions. In the transmit mode, it functions as the final, power amplification stage of the transmitter, as described below. In the receive mode, it functions as a mixer stage. The emitter of transistor Q2 is connected through a capacitor C10 to the main tank circuit, consisting of a variable capacitor C16 and an inductor L5. The tap on inductor L5 is placed to lower the tank Q (with antenna loading) so that no tuning is required for 902–928 MHz operation.

Received signals at an antenna ANT1 are passed through capacitor C10 to the emitter of transistor Q2 where they are mixed with the local oscillator output. Antenna ANT1 is identical for each transceiver, and consists essentially of a 3.2" wire which forms a quarter-wave, stub antenna. The intermediate frequency signal (at 10.7 MHz) resulting from mixing in transistor Q2 appears on the transistor's collector. This is fed through a ceramic filter FL1 (having a bandwidth of approximately 400 KHz and a center frequency of 10.7 MHz) to a three-stage amplifier made up of transistors Q3, Q4, and Q5 (disposed toward the righthand side of FIG. 4A). These transistors amplify the received signal by approximately 75 dB and feed it (via a lead A3) through a second ceramic filter FL2 (FIG. 4C) having similar filter characteristics to those of filter FL1.

Filter FL2 removes intermediate frequency amplifier noise outside the desired passband and couples the signal (through a lead A3) to an NFET Q13 (FIG. 4C) operated near cutoff. This transistor envelope-detects the signal. A capacitor C39 is provided in the output circuit of the NFET to bypass residual radio frequency energy. Note that the NFET detector passes the DC component of a data stream, is quiet and nearly driftless, and is very simple.

From the NFET, the signal is routed (through a resistor R41 and a resistor R61) to an op amp U4, configured as a comparator. It is also routed (through resistor R41 and a pair of capacitors C41 and C45) to a buffer U3-B whose output is supplied through a diode D2 to a capacitor C36. Capacitor C36 is quickly charged to the peak value of the signal. This peak value is provided to a buffer U3-A, whose output is fed through a pair of resistors R58 and R59. The output of buffer U3-A is approximately the peak value of the recovered data. Resistors R58 and R59 are configured as a divider so that the output at the junction of those resistors tracks the mid-point of the received signal. This mid-point voltage is fed to the other input of comparator U4. This arrangement causes the slice level used by comparator U4 to track the incoming signal level. This is done because the recovered data is trapezoidal, due to the finite IF bandwidth. Optimal slice level is at the half-amplitude point, which is what buffers U3-A and U3-B and resistor divider R58–R59 provide.

Chips U3-A and U3-B in combination with diode D2 and capacitor C36 form a gated peak detector-integrator. The decay time of the integrator is set to approximately 500 microseconds, to prevent excessive droop during all-one or all-zero data. The slicer itself has a rise time of less than two microseconds, to ensure that the lagging edge of the start bit of a message is sliced at the proper level.

The output of comparator U4 is supplied via pin J1-3 to microcomputer 22 (in the case of the control transceivers) or to a local processor 22A (in the case of the sensor transceivers). The computer or processor analyzes the signal as decoded in the conventional manner, using the communication protocols discussed above.

In the transmission mode, the local oscillator 41 provides the transmitter carrier. This carrier is amplified by MMIC Q11, further power amplified by final stage transistor Q2, and fed to antenna ANT1. Output power is typically 4 mW. In the transmission mode, the local oscillator is modulated by an FM subcarrier operating at 1.0 MHz. Generation of the subcarrier is accomplished using a second crystal Y2 (see FIG. 4B, lower-middle portion) suitably connected to a transistor Q10 to form a second Colpitts oscillator. The output of transistor Q10 modulates the PLL control voltage, which frequency-modulates the L.O. This produces multiple sidebands on the local oscillator output, spaced at 1 MHz intervals. Specifically, the output of transistor Q10 is fed to a main modulating transistor Q7 (lower righthand portion of FIG. 4B) whose output is supplied through a capacitor C26 to a resistor R24. The other side of resistor R24 is connected to transistor Q9 (which also receives the PLL signal from phase detector U1. As a result, the control voltage level supplied by transistor Q9 as described above to the local oscillator is a function of the signals from resistor R26 (the PLL control signal) and resistor R24 (the subcarrier modulating signal).

Of the multiple sidebands created by frequency modulation of the local oscillator by the subcarrier, one will fall within the passband of the corresponding opposite receiver and is able to pass data. The remaining sidebands are ignored. In one direction (for example, console or remote unit to sensor), the lower sideband is received; in the other (for example, sensor to console or remote unit), the upper sideband is received. Note that reversal of the local oscillator frequency assignments between console (or remote unit) and sensor reverses the upper and lower sideband useage, but has no effect on data transmission.

Because the transmit and receive frequencies of a single transceiver are both a function of the local oscillator frequency, it is possible using the present system to change both the transmit and the receive frequencies of a transceiver with only one crystal change.

The subcarrier itself is keyed on and off with data via transistor Q7. The computer or processor supplies the desired data via pin J1-2 (FIG. 4C), which is connected by a lead 51 to the base of transistor Q7 (FIG. 4B). The data AM modulates the subcarrier so that the signal supplied to final stage Q2 is a product of the local oscillator, with an AM-modulated, FM-subcarrier during the transmit mode.

By means of pin J1-5 (FIG. 4C), during the receive mode the computer or processor further gates off the subcarrier prior to it getting through to the modulator Q7. This is accomplished by means of a pair of transistors Q12 and Q15 (FIG. 4C, bottom lefthand corner) connected to pin J1-5 (the transmit/receive pin). During reception, these transistors gate off the subcarrier output via a lead 53 connected through a resistor R34 to subcarrier transistor Q10. This lowers subcarrier leakthrough to prevent spurs on the local oscillator output during the receive mode. Spurs could cause a rise in receiver noise by mixing with unwanted signals and ambient noise. With this approach, 80 dB of attenuation of the subcarrier during the receive mode is attained.

The transmit and receive portions of each transceiver are "on" at all times. This allows good turnaround time. During the transmit mode, the modulated local oscillator signal, if allowed to affect the receiver portion of the circuit, would appear as high-level noise. This is prevented by use of a pair of transistors Q17 and Q18 (FIG. 4C) connected to the transmit/receive pin J1-5. During the transmit mode (as indicated by the state of pin J1-5), transistor Q17 gates the received signal off, which prevents capacitor C36 (the peak value following capacitor) from following transmitted data and upsetting the slice level. Similarly, transistor Q18 causes the slicer bias (from chip U3-A) to rail at +5 volts, which prevents comparator U4 from responding. This keeps the receiver in the mark state during the transmit mode.

Although the values of the particular components used in the circuitry of FIGS. 4A–4C are a matter of choice with the individual designer, the following values have been found to provide satisfactory operation:

| Component | Values and Part Nos. |
|---|---|
| C1, C2, C8, C26, C27, C35, C36, C38, C42, C44 | 1000 pF, 50 V, 10% |
| C10, C28, C45 | 470 pF, 50 V, 5% |
| C13, C25, C39 | 27 pF, 50 V, 5% |
| C14 | .01 uF, 50 V, 10% |
| C15, C43, C48, C46, C29 | .1 uf, 50 V, 10% |
| C16 | 1.8–6 F, 100 VDC, +50%–0% |
| C19, C33 | 1 uF, 35 V, 20% |
| C20 | 22 pF, 50 V, 5% |
| C21, C22 | 47 pF, 50 V, 5% |
| C23 | 270 pF, 50 V, 10% |
| C3 | 1.0 pF, 50 V, .25 pF |
| C31 | 4–20 pF, 100 VDC, +50%–0% |
| C32, C40 | 10 uF, 10 V, 20% |
| C4, C7, C30, C34, C37 | 2.2 pf, 50 V, .25 pF |
| C41 | 56 pF, 50 V, 5% |
| C5 | 10 pF, 50 V, .5 pF |
| C6, C11, C12, C17, C18, C24, C49 | 100 pF, 50 V, 5% |
| D1, D2, D3, D4 | BAS16 |
| FL1, FL2 | SFE10.7MA21 |
| Q1, Q2 | BF770A |
| Q3, Q4, Q5, Q6, Q7, Q14 | PMBT3904 |
| Q8, Q9 | BFT46 |
| Q10 | BFR30 |
| Q11 | UPC2708 |
| Q12, Q15, Q17, Q18 | SN7002 |
| Q13 | BFT46 |
| Q16 | J107 |
| R1, R2, R22, R25, R32, R34, R56, R59 | 4.7K, ⅛ W, 5% |
| R13, R42, R44, R45 | 680 Ohm, ⅛ W, 5% |
| R14, R21, R39, R53 | 1K, ⅛ W, 5% |
| R15 | 47K, ⅛ W, 5% |
| R16, R58 | 2.2K, ⅛ W, 5% |
| R18 | 15 Ohm, ⅛ W, 5% |
| R19, R20, R30, R31, R37, R51 | 1M, ⅛ W, 5% |
| R23 | 1K, .05 W, 25% |
| R26 | 3.9K, ⅛ W, 5% |
| R29, R61 | 100 Ohm, ⅛ W, 5% |
| R3, R12 | 270 Ohm, ⅛ W, 5% |
| R33, R41 | 6.8K, ⅛ W, 5% |
| R36 | 47 Ohm, ⅛ W, 5% |
| R38, R40, R49 | 27K, ⅛ W, 5% |
| R4 | 68 Ohm, ⅛ W, 5% |
| R43 | 5K, .05 W, 25% |
| R46 | 22K, ⅛ W, 5% |
| R47 | 470K, ⅛ W, 5% |
| R5, R17, R24, R27, R28, R35, R50, R52 | 10K, ⅛ W, 5% |
| R54 | 330K, ⅛ W, 5% |
| R55 | 270K, ⅛ W, 5% |

-continued

| Component | Values and Part Nos. |
|---|---|
| R6, R7, R8 | 390 Ohm, ⅛ W, 5% |
| R9, R10, R11 | 100K, ⅛ W, 5% |
| R48 | 330 Ohm, ⅛ W, 5% |
| U1 | 74HC4046 |
| U2 | MB506 |
| U3-A, U3-B | CA5260 |
| U4-A | LM393 |
| Z1 | PMLL5230 |

In view of the above, it will be seen that the various objects and features of the present invention are achieved and other advantageous results obtained. The examples and description contained herein are illustrative only and are not to be taken in a limiting sense.

What is claimed is:

1. Vehicle wheel alignment apparatus comprising:

a wheel alignment sensor removably mountable to a vehicle wheel for providing alignment data;

a controller responsive to data from the wheel alignment sensor for determining wheel alignment characteristics of the wheel under test;

a first radio frequency sensor receiver, disposed at the sensor, for receiving radio frequency signals;

a first radio frequency sensor transmitter, disposed at the sensor and operatively connected thereto, for transmitting radio frequency signals carrying alignment data from the sensor;

at least first and second radio frequency controller receiver circuits, disposed at the controller and operatively connected thereto, for receiving signals from the sensor transmitter;

at least first and second radio frequency controller transmitter circuits, disposed at the controller and operatively connected thereto, for transmitting signals to the sensor receiver;

said sensor receiver being tuned to receive signals transmitted by the controller transmitter circuits for communication between the controller and the sensor receiver;

each of said first and second controller receiver circuits being tuned to receive signals transmitted by the sensor transmitter for communication of wheel alignment data from the sensor transmitter to the controller.

2. The vehicle wheel alignment apparatus as set forth in claim 1 wherein each of the controller transmitter circuits are under control of the controller, the controller selecting a controller transmitter circuit for transmitting information to the sensor receiver based upon predetermined criteria.

3. The vehicle wheel alignment apparatus as set forth in claim 2 wherein the controller switches from one controller transmitter circuit to another controller transmitter circuit for transmitting information to the sensor receiver upon a failure to respond to a signal from said one controller transmitter.

4. The vehicle wheel alignment apparatus as set forth in claim 1 wherein each of the controller receiver circuits are under control of the controller, the controller selecting a controller receiver circuit for receiving information from the sensor transmitter based upon predetermined criteria.

5. The vehicle wheel alignment apparatus as set forth in claim 4 wherein the controller switches from one controller receiver circuit to another controller receiver circuit for receiving information from the sensor transmitter when the signal received by said one controller receiver circuit is garbled.

6. The vehicle wheel alignment apparatus as set forth in claim 1 further including at least a third controller receiver circuit and a third controller transmitter circuit disposed at the controller and operatively connected thereto.

7. The vehicle wheel alignment apparatus as set forth in claim 1 wherein the controller controls the controller transmitter circuits such that only one controller transmitter circuit is transmitting at one time.

8. The vehicle wheel alignment apparatus as set forth in claim 7 wherein the controller sequentially switches among the controller transmitter circuits until there is a response to a signal from a controller transmitter circuit.

9. The vehicle wheel alignment apparatus as set forth in claim 1 wherein the controller controls the controller receiver circuits such that only one controller receiver circuit is active at one time.

10. The vehicle wheel alignment apparatus as set forth in claim 9 wherein the controller sequentially switches among the controller receiver circuits until the signal received from the sensor transmitter is ungarbled.

11. The vehicle wheel alignment apparatus as set forth in claim 1 wherein the first controller transmitter circuit and the first controller receiver circuit make up one controller transceiver, and the second controller transmitter circuit and the second controller receiver circuit make up a second controller transceiver.

12. The vehicle wheel alignment apparatus as set forth in claim 11 wherein the controller controls the transmitter and receiver portions of the controller transceivers independently.

13. The vehicle wheel alignment apparatus as set forth in claim 12 wherein the controller selects the transmitter circuit of said one controller transceiver and the receiver circuit of said second controller transceiver when there is no response to a signal from the transmitter of said second controller transceiver and the data received by the receiver circuit of said one controller transceiver is garbled.

14. The vehicle wheel alignment apparatus as set forth in claim 1 wherein the sensor transmitter transmits at a first frequency and the controller transmitter circuits transmit at a second, substantially different frequency.

15. The vehicle wheel alignment apparatus as set forth in claim 1 further including at least a second wheel alignment sensor adapted to be mounted to a second vehicle wheel for providing alignment data, said controller being responsive to data from the second wheel alignment sensor for determining wheel alignment characteristics of a second wheel under test, a second radio frequency sensor receiver, disposed at the second sensor, for receiving radio frequency signals from the controller transmitters, and a second radio frequency sensor transmitter, disposed at the second sensor and operatively connected thereto, for transmitting radio frequency signals carrying alignment data from the sensor to the controller receiver circuits.

16. The vehicle wheel alignment apparatus as set forth in claim 15 wherein the first and second sensor transmitters transmit on substantially the same frequency, and wherein the first and second sensor receivers receive on a second substantially different frequency.

17. The vehicle wheel alignment apparatus as set forth in claim 1 wherein the receivers and transmitters all operate in a UHF band.

18. A method of communicating between at least one vehicle wheel alignment sensor and a controller of vehicle wheel alignment apparatus, comprising:

providing a sensor transceiver operatively connected to a wheel alignment sensor;

providing a first controller transceiver circuit operatively connected to a controller, said controller being responsive to data from the wheel alignment sensor for determining wheel alignment characteristics of the wheel under test;

providing at least a second controller transceiver circuit operatively connected to the controller;

switching between controller transceiver circuits for signal transmission when the sensor transceiver does not respond, and switching between controller transceiver circuits for signal reception when the received signal is garbled.

19. The method of communicating between at least one vehicle wheel alignment sensor and a controller of vehicle wheel alignment apparatus as set forth in claim 18 wherein each controller transceiver circuit has transmitter and receiver portions which are separately controllable by the controller, said step of switching between controller transceiver circuits for signal transmission including switching between the transmitter portions of the controller transceiver circuits when the sensor transceiver does not respond without necessarily switching between receiver portions of the controller transceiver circuits.

20. The method of communicating between at least one vehicle wheel alignment sensor and a controller of vehicle wheel alignment apparatus as set forth in claim 19 wherein the step of switching between controller transceiver circuits for signal reception when the received signal is garbled includes switching between the receiver portions of the controller transceiver circuits when the received signal is garbled without necessarily switching between transmitter portions of the controller transceiver circuits.

21. The method of communicating between at least one vehicle wheel alignment sensor and a controller of vehicle wheel alignment apparatus as set forth in claim 19 wherein during predetermined conditions the controller communicates with the sensor transceiver using the transmitter portion of one of the controller transceiver circuits and the receiver portion of another of the controller transceiver circuits.

* * * * *